C. J. GREENE.
TELEGRAPH-KEY.
No. 178,433.    Patented June 6, 1876.
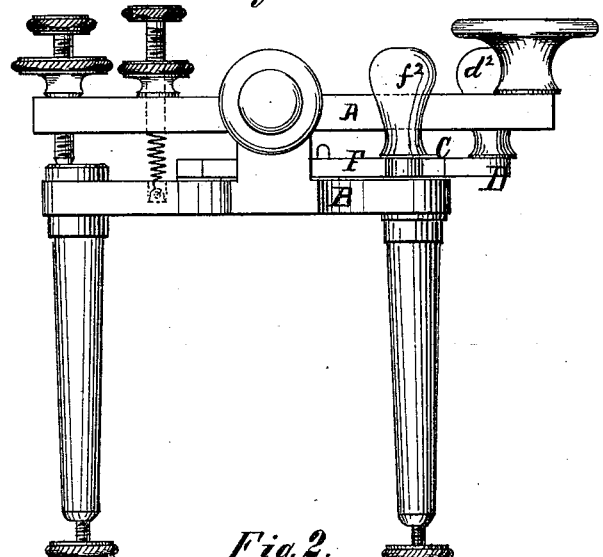
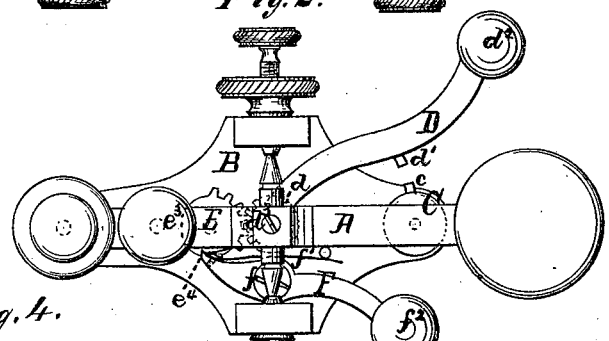
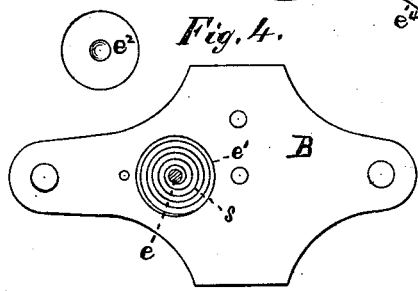
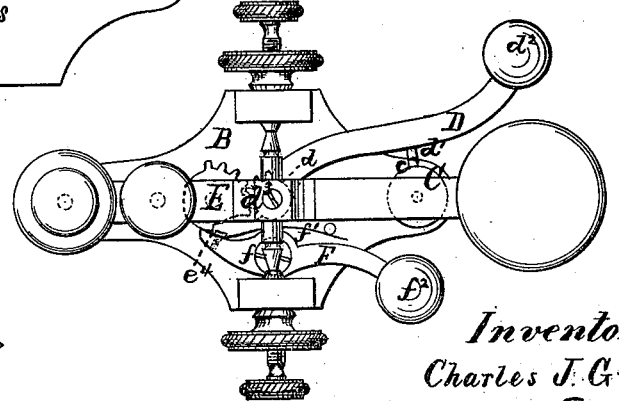
Witnesses:
Henry Eichling
C. S. Clark
Inventor:
Charles J. Greene
By Fitch & Fitch
Attys.

UNITED STATES PATENT OFFICE.

CHARLES J. GREENE, OF HURON, OHIO.

IMPROVEMENT IN TELEGRAPH-KEYS.

Specification forming part of Letters Patent No. 178,433, dated June 6, 1876; application filed March 7, 1876.

*To all whom it may concern:*

Be it known that I, CHARLES J. GREENE, of Huron, Erie county, State of Ohio, have invented an Improved Telegraph Key or Manipulator, of which the following is a full, clear, and exact description, reference being had to the accompanying drawings, which form part of this specification.

My invention consists in a pivoted switch-lever carrying a platinum point, arranged to impinge upon a similar point on the anvil, and provided with cogs, which mesh into a pinion mounted on the base-plate, said pinion having about its shaft a coil-spring, and having upon its rim a notch, in which engages a dog, provided with a controlling leaf-spring, and pivoted upon the base-plate, all constructed and arranged to operate in connection with the key, as hereinafter particularly set forth.

Figure 1 is a side elevation of my telegraph-manipulator. Fig. 2 is a plan of same, showing the switch in position to open the circuit. Fig. 3 is a similar view of the same, showing the circuit closed. Fig. 4 is an underside view of the base-plate.

A is the key. B is the base-plate. C is the anvil, having a platinum point, $c$, on its side, as shown. D is the switch-lever pivoted to the base-plate at $d$, and carrying the platinum point $d^1$, which is arranged to rest against the similar point $c$ on the anvil, when the lever is in the position shown in Fig. 3, to close the circuit. The switch-lever is preferably provided with a handle, $d^2$, which is extended up to about the level of the key-handle. Upon the opposite end the said lever D is provided with the cogs $d^3$, which are arranged in the form of a segment, as shown. These cogs mesh into the cogs upon the irregular pinion E, which is mounted on a short shaft in the base-plate. Around this shaft $e$ is arranged a coil-spring, $s$, in a recess, $e^1$, formed in the under side of the base-plate, as seen in Fig. 4. A cap-piece, $e^2$, is fitted into this recess around the shaft, and furnishes a bearing thereto, at the same time covering the spring, and holding it securely in place, and giving a smooth surface to the under side of the base-plate. F is a dog, which is pivoted, at $f$, upon the base-plate, and is provided with the leaf-spring $f^1$. The jaw of the dog by means of this spring is pressed against the irregular pinion E. The said pinion has a smooth rim, $e^3$, on the side opposite to the cogs, as shown, and is provided with a notch at $e^4$, on the side next the dog. A handle, $f^2$, is arranged upon the dog similar to the handle of the switch-lever D.

When it is desired to open the circuit in order to operate the key the switch-lever D is forced backward from the anvil, thereby turning the pinion E until the dog F catches in the notch $e^3$ in the pinion, when the parts are held by the dog in the position shown in Fig. 2. To close the circuit, the dog F is drawn toward the key, thus releasing the pinion E, the coil-spring on the shaft of which acts to turn the said pinion, and thus bring the switch-lever D into the position shown in Fig. 3.

One advantage of my invention is that, the switch-lever being held by spring-pinion E, the lever cannot be so easily separated from the anvil by accident, and the circuit thus broken, as is the case in switches as now constructed. Another advantage is the great ease with which the circuit can be opened and closed by the operator, with but a slight motion of the hand, as is obvious.

What I claim as my invention, and desire to secure by Letters Patent, is—

In a telegraph manipulator or key, the combination of the pivoted switch-lever D carrying the platinum point $d^1$, and provided with cogs $d^3$, the irregular pinion E, provided with coil-spring $s$, smooth rim $e^3$, and notch $e^4$, together with the pivoted spring-dog F, all arranged to operate as described, and for the purpose specified.

CHARLES JAY GREENE.

Witnesses:
CHARLES W. SADLER,
E. B. SADLER.